(12) United States Patent
Chan

(10) Patent No.: US 12,500,527 B2
(45) Date of Patent: Dec. 16, 2025

(54) POWER SUPPLY DEVICE WITH HIGH OUTPUT STABILITY

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 389 days.

(21) Appl. No.: 18/162,789

(22) Filed: Feb. 1, 2023

(65) Prior Publication Data

US 2024/0162832 A1 May 16, 2024

(30) Foreign Application Priority Data

Nov. 15, 2022 (TW) .................................. 111143489

(51) Int. Cl.
*H02M 7/219* (2006.01)
*H02M 1/00* (2006.01)

(52) U.S. Cl.
CPC .......... *H02M 7/219* (2013.01); *H02M 1/0022* (2021.05); *H02M 1/0035* (2021.05)

(58) Field of Classification Search
CPC ............ H02M 7/00; H02M 7/02; H02M 7/04; H02M 7/062; H02M 7/12; H02M 7/125; H02M 7/155; H02M 7/162; H02M 7/1623; H02M 7/1626; H02M 7/21; H02M 7/217; H02M 7/219; H02M 7/2195; H02M 1/0003; H02M 1/0016; H02M 1/0019; H02M 1/0022; H02M 1/0025; H02M 1/0032; H02M 1/0035; H02M 1/0043; H02M 1/0067; H02M 1/14; H02M 1/143; H02M 1/146; H02M 1/15; H02M 1/36; H02M 1/42; H02M 1/4208; H02M 1/4216; H02M 1/4225; H02M 1/4233; H02M 1/4241; H02M 1/425; H02M 1/4258; H02M 1/4266; H02M 1/4275; H02M 1/4283;
(Continued)

(56) References Cited

U.S. PATENT DOCUMENTS

2006/0285370 A1 12/2006 Lee et al.
2007/0025127 A1 2/2007 McGarry et al.
(Continued)

OTHER PUBLICATIONS

European Office Action dated Oct. 23, 2024, issued in application No. EP 23155469.2.
(Continued)

*Primary Examiner* — Thienvu V Tran
*Assistant Examiner* — Carlos O Rivera-Perez
(74) *Attorney, Agent, or Firm* — McClure, Qualey & Rodack, LLP

(57) ABSTRACT

A power supply device with high output stability includes a bridge rectifier, a first inductor, a first power switch element, a first output stage circuit, a transformer, a second power switch element, a second output stage circuit, a compensation circuit, an MCU (Microcontroller Unit), and a PD (Power Delivery) IC (Integrated Circuit). The PD IC generates a state voltage according to a communication voltage. The MCU operates in a normal mode or a burst mode according to the state voltage. In the normal mode, the MCU controls the second output stage circuit to provide an output voltage. In the burst mode, the MCU controls the compensation circuit to provide an output voltage.

6 Claims, 4 Drawing Sheets

(58) Field of Classification Search
CPC .... H02M 1/4291; H02M 1/0093; H02M 3/22;
H02M 3/24; H02M 3/28; H02M 3/315;
H02M 3/335; H02M 3/33507; H02M
3/33515; H02M 3/33523; H02M 3/3353;
H02M 3/33538; H02M 3/33546; H02M
3/33553
USPC .......... 363/15–21.18, 37, 39, 40–46, 65, 89,
363/101, 123, 131–134, 147;
323/205–211, 234, 266, 268, 271–275,
323/280, 282–288, 351
See application file for complete search history.

(56) References Cited

U.S. PATENT DOCUMENTS

2021/0313823 A1\* 10/2021 Chan ..................... H02J 7/0047
2022/0045540 A1\* 2/2022 Zhang ............... H02M 3/33546

OTHER PUBLICATIONS

Hung, Y., et al.; "Pulse-Skipping Power Factor Correction Control Schemes for ACDC Power Converters;" 4th International Conference on Power Engineering and Electrical Devices; May 2013; pp. 1087-1092.
Extended European Search Report dated Aug. 24, 2023, issued in application No. EP 23155469.2.
Seong, H.W., et al.; "High Step-Up DC-DC Converters Using Zero-Voltage Switching Boost Integration Technique and Light-Load Frequency Modulation Control;" IEEE Transactions on Power Electronics; vol. 27; No. 3; Mar. 2012; pp. 1383-1400.
Madsen, M.P., et al.; "Input-output rearrangement of isolated converters;" IEEE; 2015; pp. 1-6.

\* cited by examiner

US 12,500,527 B2

POWER SUPPLY DEVICE WITH HIGH OUTPUT STABILITY

CROSS REFERENCE TO RELATED APPLICATIONS

This application claims priority of Taiwan Patent Application No. 111143489 filed on Nov. 15, 2022, the entirety of which is incorporated by reference herein.

BACKGROUND OF THE INVENTION

Field of the Invention

The disclosure generally relates to a power supply device, and more specifically, to a power supply device with high output stability.

Description of the Related Art

Power supply devices are indispensable elements in the field of notebook computers. However, if a power supply device has insufficient output stability, the overall operational performance of the notebook computer may suffer. Accordingly, there is a need to propose a novel solution for solving the problems of the prior art.

BRIEF SUMMARY OF THE INVENTION

In an exemplary embodiment, the invention is directed to a power supply device with high output stability. The power supply device includes a bridge rectifier, a first inductor, a first power switch element, a first output stage circuit, a transformer, a second power switch element, a second output stage circuit, a compensation circuit, an MCU (Microcontroller Unit), and a PD (Power Delivery) IC (Integrated Circuit). The bridge rectifier generates a rectified voltage according to a first input voltage and a second input voltage. The first inductor receives the rectified voltage. The first power switch element selectively couples the first inductor to a ground voltage according to a clock voltage. The first output stage circuit is coupled to the first inductor. The transformer includes a main coil and a secondary coil. The main coil is coupled to the first output stage circuit. The second power switch element selectively couples the main coil to the ground voltage according to the clock voltage. The second output stage circuit is coupled to the secondary coil. The compensation circuit receives the rectified voltage. The MCU generates the clock voltage. The PD IC generates state voltage according to the communication voltage. The MCU operates in normal mode or burst mode according to the state voltage. In the normal mode, the MCU controls the second output stage circuit to provide an output voltage. In the burst mode, the MCU controls the compensation circuit to provide an output voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows:

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
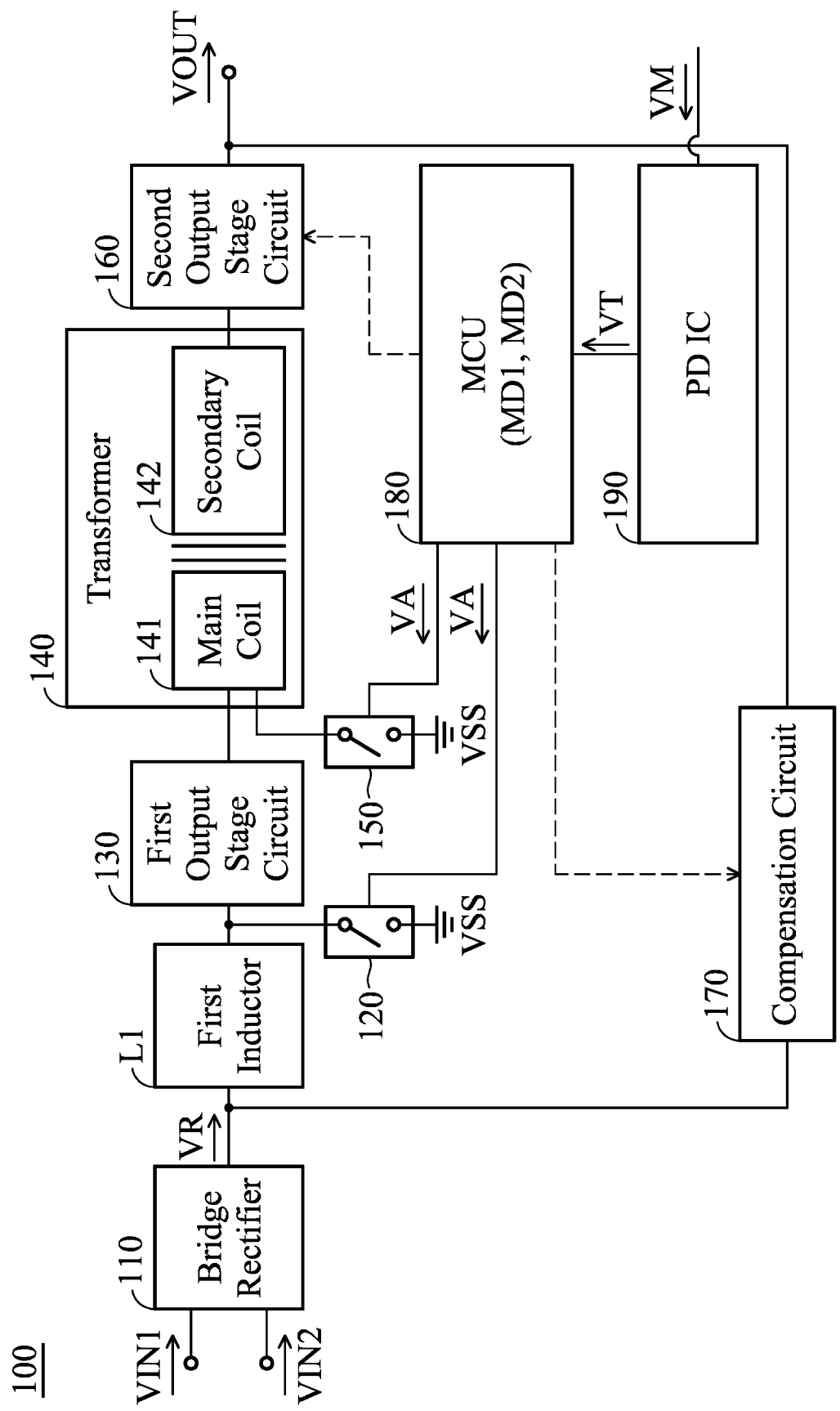
FIG. 1 is a diagram of a power supply device according to an embodiment of the invention.

FIG. 1 is a diagram of a power supply device 100 according to an embodiment of the invention. For example, the power supply device 100 may be applied to a desktop computer, a notebook computer, or an all-in-one computer. As shown in FIG. 1, the power supply device 100 includes a bridge rectifier 110, a first inductor L1, a first power switch element 120, a first output stage circuit 130, a transformer 140, a second power switch element 150, a second output stage circuit 160, a compensation circuit 170, an MCU (Microcontroller Unit) 180, and a PD (Power Delivery) IC (Integrated Circuit) 190. It should be noted that the power supply device 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be substantially from 90V to 264V, but it is not limited thereto. The first inductor L1 receives the rectified voltage VR. The first power switch element 120 selectively couples the first inductor L1 to a ground voltage VSS (e.g., 0V) according to a clock voltage VA. For example, if the clock voltage VA has a high logic level (i.e., a logic "1"), the first power switch element 120 may couple the first inductor L1 to the ground voltage VSS (i.e., the first power switch element 120 is similar to a short-circuited path). Conversely, if the clock voltage VA has a low logic level (i.e., a logic "0"), the first power switch element 120 may not couple the first inductor L1 to the ground voltage VSS (i.e., the first power switch element 120 is similar to an open-circuited path). The first output stage circuit 130 is coupled to the first inductor L1. The transformer 140 includes a main coil 141 and a secondary coil 142. The main coil 141 is positioned at a side of the transformer 140, and the secondary coil 142 is positioned at an opposite side of the transformer 140. The main coil 141 is coupled to the first output stage circuit 130. The second power switch element 150 selectively couples the main coil 141 to the ground voltage VSS according to the clock voltage VA. For example, if the clock voltage VA has a high logic level, the second power switch element 150 may couple the main coil 141 to the ground voltage VSS (i.e., the second power switch element 150 is similar to a short-circuited path). Conversely, if the clock voltage VA has a low logic level, the second power switch element 150 may not couple the main coil 141 to the ground voltage VSS (i.e., the second power switch element 150 is similar to an open-circuited path). The second output stage circuit 160 is coupled to the secondary coil 142. The compensation circuit 170 receives the rectified voltage VR. The MCU 180 generates the clock voltage VA. The PD IC 190 generates a state voltage VT according to a communication voltage VM. The MCU 180 can operate in a normal mode MD1 or a burst mode MD2 according to the state voltage VT. For example, in the normal mode MD1, the MCU 180 can control the second output stage circuit 160 to provide an output voltage VOUT. Conversely, in the burst mode MD2, the MCU 180 can control the compensation circuit 170 to provide an output voltage VOUT. For example, the output voltage VOUT may be a DC (Direct Current) voltage, whose voltage level may be from 5V to 48V, but it is not limited thereto. With such a design, the power supply device 100 can automatically adjust the supply of the output voltage VOUT according to different operational modes, so as to significantly increase its output stability.

The following embodiments will introduce the detailed structure and operation of the power supply device 100. It should be understood these figures and descriptions are merely exemplary, rather than limitations of the invention.

Figure 2:
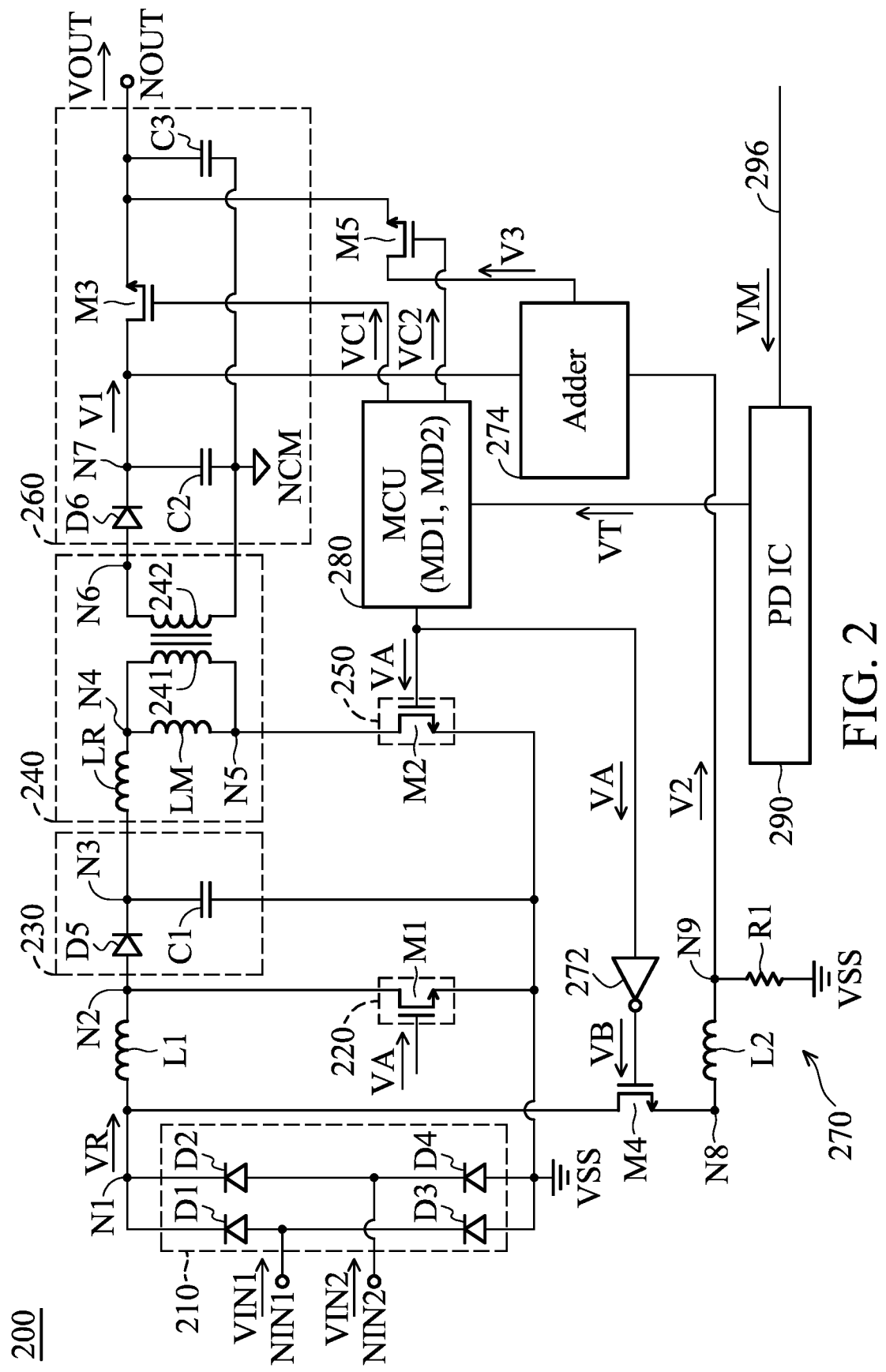
FIG. 2 is a circuit diagram of a power supply device according to an embodiment of the invention.

FIG. 2 is a circuit diagram of a power supply device 200 according to an embodiment of the invention. In the embodiment of FIG. 2, the power supply device 200 with a first input node NIN1, a second input node NIN2, and an output node NOUT includes a bridge rectifier 210, a first inductor L1, a first power switch element 220, a first output stage circuit 230, a transformer 240, a second power switch element 250, a second output stage circuit 260, a compensation circuit 270, an MCU 280, and a PD IC 290. The first input node NIN1 and the second input node NIN2 of the power supply device 200 are arranged for receiving a first input voltage VIN1 and a second input voltage VIN2, respectively. The output node NOUT of the power supply device 200 is arranged for outputting an output voltage VOUT to a system end (not shown), such as a notebook computer.

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the second input node NIN2, and a cathode coupled to the first node N1. The third diode D3 has an anode coupled to a ground voltage VSS, and a cathode coupled to the first input node NIN1. The fourth diode D4 has an anode coupled to the ground voltage VSS, and a cathode coupled to the second input node NIN2.

The first inductor L1 has a first terminal coupled to the first node N1 for receiving the rectified voltage VR, and a second terminal coupled to a second node N2.

The first power switch element 220 includes a first transistor M1. For example, the first transistor M1 may be an NMOSFET (N-type Metal Oxide Semiconductor Field Effect Transistor). The first transistor M1 has a control terminal (e.g., a gate) for receiving a clock voltage VA, a first terminal (e.g., a source) coupled to the ground voltage VSS, and a second terminal (e.g., a drain) coupled to the second node N2.

The first output stage circuit 230 includes a fifth diode D5 and a first capacitor C1. The fifth diode D5 has an anode coupled to the second node N2, and a cathode coupled to a third node N3. The first capacitor C1 has a first terminal coupled to the third node N3, and a second terminal coupled to the ground voltage VSS.

The transformer 240 includes a main coil 241 and a secondary coil 242. A leakage inductor LR and a magnetizing inductor LM are built in the transformer 240. The leakage inductor LR and the magnetizing inductor LM are inherent elements, which are generated when the transformer 240 is manufactured, and they are not external independent elements. The leakage inductor LR, the main coil 241, and the magnetizing inductor LM may be positioned at the same side (e.g., the primary side) of the transformer 240. The secondary coil 242 may be positioned at the opposite side (e.g., the secondary side isolated from the primary side) of the transformer 240. Specifically, the leakage inductor LR has a first terminal coupled to the third node N3, and a second terminal coupled to a fourth node N4. The main coil 241 has a first terminal coupled to the fourth node N4, and a second terminal coupled to a fifth node N5. The magnetizing inductor LM has a first terminal coupled to the fourth node N4, and a second terminal coupled to the fifth node N5. The secondary coil 242 has a first terminal coupled to a sixth node N6, and a second terminal coupled to a common node NCM. For example, the common node NCM may be considered as another ground voltage, which may be the same as or different from the aforementioned ground voltage VSS.

The second power switch element 250 includes a second transistor M2. For example, the second transistor M2 may be an NMOSFET. The second transistor M2 has a control terminal (e.g., a gate) for receiving the clock voltage VA, a first terminal (e.g., a source) coupled to the ground voltage VSS, and a second terminal (e.g., a drain) coupled to the fifth node N5.

The second output stage circuit 260 includes a third transistor M3, a sixth diode D6, a second capacitor C2, and a third capacitor C3. For example, the third transistor M3 may be an NMOSFET. The sixth diode D6 has an anode coupled to the sixth node N6, and a cathode coupled to a seventh node N7 for outputting a first voltage V1. The second capacitor C2 has a first terminal coupled to the seventh node N7, and a second terminal coupled to the common node NCM. The third transistor M3 has a control terminal (e.g., a gate) for receiving a first control voltage VC1, a first terminal (e.g., a source) coupled to the output node NOUT, and a second terminal (e.g., a drain) coupled to the seventh node N7 for receiving the first voltage V1. The third capacitor C3 has a first terminal coupled to the output node NOUT, and a second terminal coupled to the common node NCM.

The compensation circuit 270 includes an inverter 272, an adder 274, a fourth transistor M4, a fifth transistor M5, a second inductor L2, and a resistor R1. For example, each of the fourth transistor M4 and the fifth transistor M5 may be an NMOSFET.

The inverter 272 has an input terminal for receiving the clock voltage VA, and an output terminal for outputting an inverted voltage VB. The fourth transistor M4 has a control terminal (e.g., a gate) for receiving the inverted voltage VB, a first terminal (e.g., a source) coupled to an eighth node N8, and a second terminal (e.g., a drain) coupled to the first node N1 for receiving the rectified voltage VR. The second inductor L2 has a first terminal coupled to the eighth node N8, and a second terminal coupled to a ninth node N9 for outputting a second voltage V2. The resistor R1 has a first terminal coupled to the ninth node N9, and a second terminal coupled to the ground voltage VS S.

The adder 274 can add up the first voltage V1 and the second voltage V2, so as to generate a third voltage V3. The fifth transistor M5 has a control terminal (e.g., a gate) for receiving a second control voltage VC2, a first terminal (e.g., a source) coupled to the output node NOUT, and a second terminal (e.g., a drain) for receiving the third voltage V3. In some embodiments, the operational principles of the adder 274 will be described as the following equation (1):

$$V3=V1+V2 \quad (1)$$

where "V1" represents the voltage level of the first voltage V1, "V2" represents the voltage level of the second voltage V2, and "V3" represents the voltage level of the third voltage V3.

The MCU 280 generates the aforementioned clock voltage VA. For example, the clock voltage VA may be maintained at a constant voltage level when the power supply device 200 is initialized. The clock voltage VA may provide a periodic clock waveform when the power supply device 200 is normally operated.

The PD IC 290 generates a state voltage VT according to a communication voltage VM. In some embodiments, the power supply device 200 supports the standard of USB (Universal Serial Bus) Type-C, and the PD IC 290 receives the communication voltage VM through a CC (Configuration Channel) pin 296. For example, when the power supply device 200 is coupled to a system end, the PD IC 290 may output a constant current to the CC pin 296, and then may receive the communication voltage VM through the CC pin 296 from the system end. After the communication voltage VM is analyzed, the state voltage VT generated by the PD IC 290 can be used to indicate a desired operational mode.

The MCU 280 can operate in a normal mode MD1 or a burst mode MD2 according to the state voltage VT from the PD IC 290. For example, the MCU 280 may generate the first control voltage VC1 and the second control voltage VC2 according to the state voltage VT. The first control voltage VC1 and the second control voltage VC2 may have complementary logic levels. In some embodiments, if the communication voltage VM falls within a specific range, the MCU 280 will operate in the normal mode MD1; conversely, if the communication voltage VM falls outside the aforementioned specific range, the MCU 280 will operate in the burst mode MD2, but the invention is not limited thereto.

In the normal mode MD1, the MCU 280 generates the first control voltage VC1 at a high logic level and the second control voltage VC2 at a low logic level. At this time, the third transistor M3 is enabled, and thus the second output stage circuit 260 provides the first voltage V1, which is used as the output voltage VOUT of the power supply device 200. On the other hand, because the fifth transistor M5 is disabled, the compensation circuit 270 does not provide any output voltage VOUT.

In the burst mode MD2, the MCU 280 generates the first control voltage VC1 at a low logic level and the second control voltage VC2 at a high logic level. At this time, the fifth transistor M5 is enabled, and thus the compensation circuit 270 provides the third voltage V3, which is used as the output voltage VOUT of the power supply device 200. On the other hand, because the third transistor M3 is disabled, the second output stage circuit 260 does not provide any output voltage VOUT.

Figure 3:
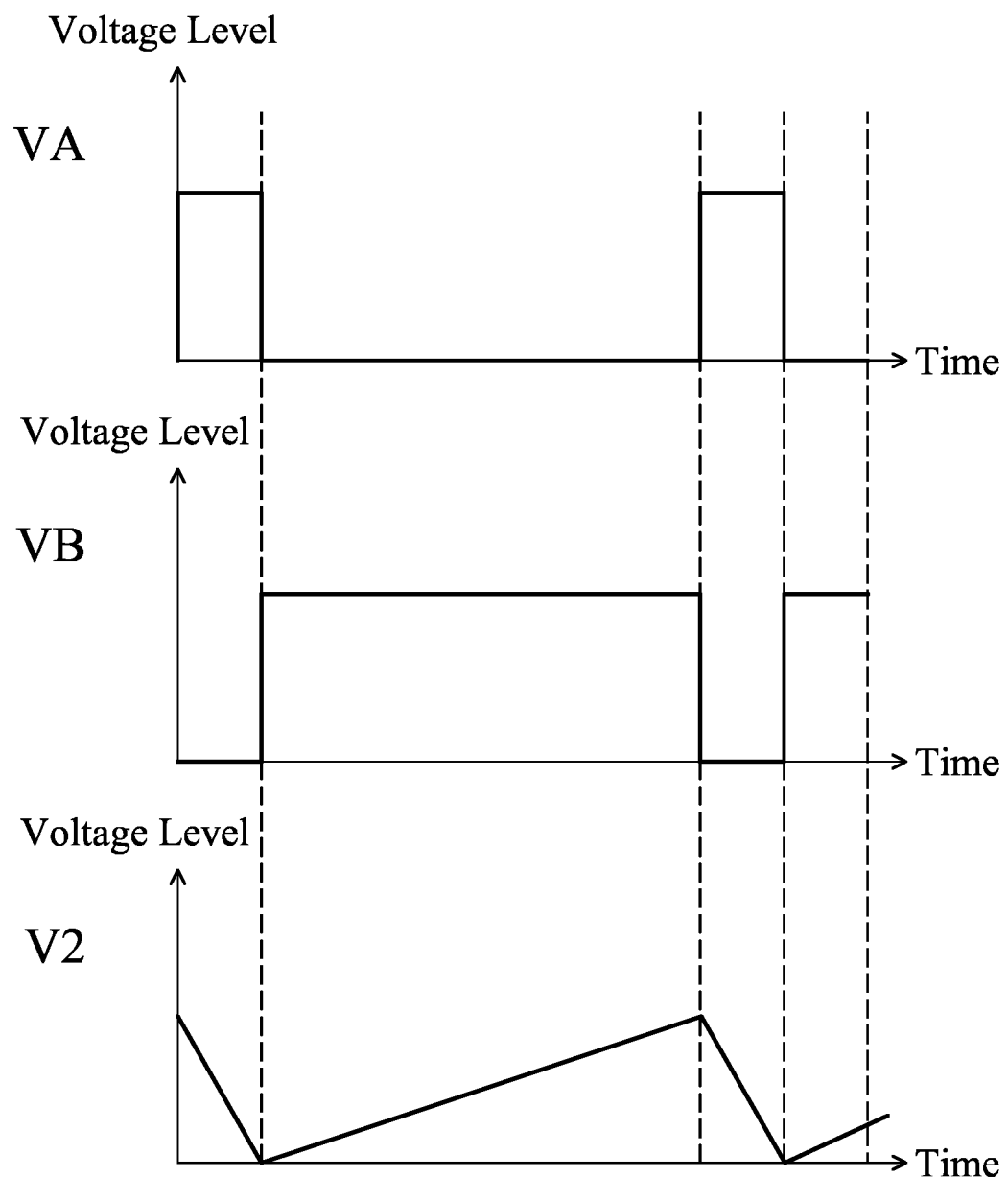
FIG. 3 is a diagram of signal waveforms of a power supply device operating in a burst mode according to an embodiment of the invention.

FIG. 3 is a diagram of signal waveforms of the power supply device 200 operating in the burst mode MD2 according to an embodiment of the invention. Generally, if it is detected that the output voltage VOUT gradually decreases from a high voltage level, the PD IC 290 will notify the MCU 280 to switch from the normal mode MD1 to the burst mode MD2, thereby reducing the overall power consumption. According to the measurement of FIG. 3, in the burst mode MD2, the MCU 280 also reduces the switching frequency of the clock voltage VA, and the compensation circuit 270 generates the second voltage V2 corresponding to the first voltage V1.

Figure 4:
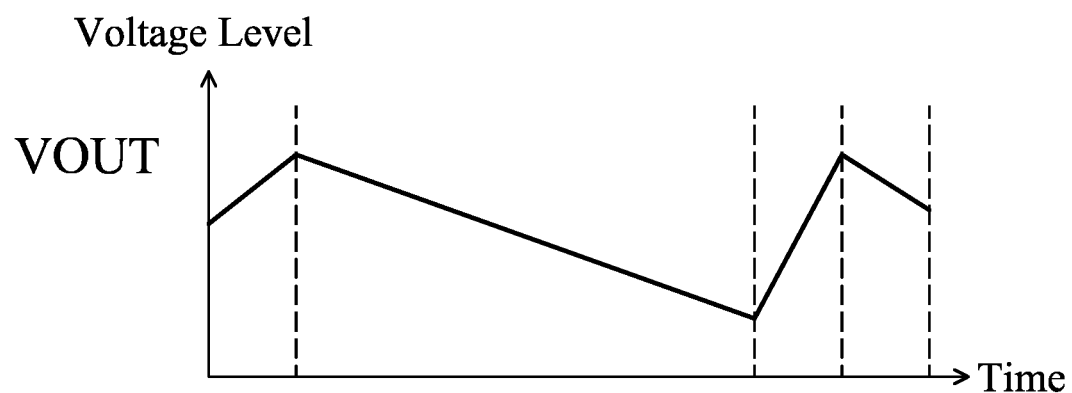
FIG. 4 is a diagram of a waveform of an output voltage of a conventional power supply device.

FIG. 4 is a diagram of a waveform of an output voltage VOUT of a conventional power supply device. In a conventional design, if the burst mode MD2 is entered, the output voltage VOUT may generate non-ideal ripples due to the lower switching frequency of the clock voltage VA, such that the whole output stability may decrease.

Figure 5:
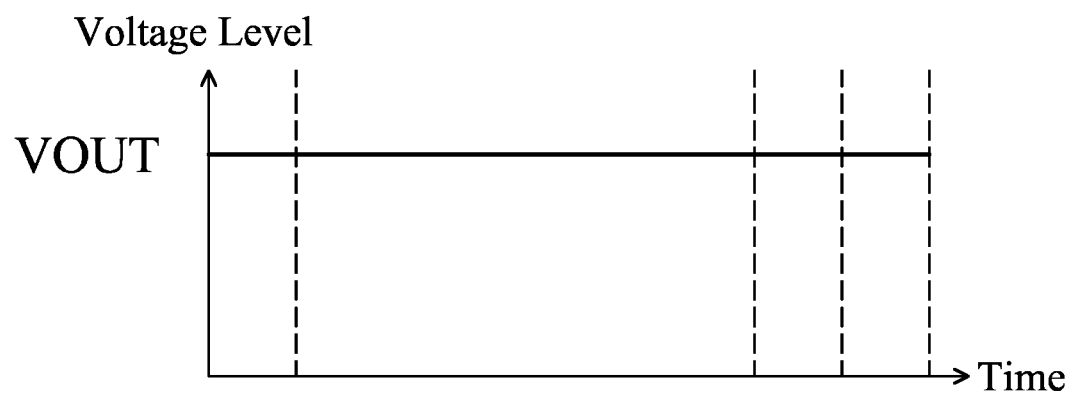
FIG. 5 is a diagram of a waveform of an output voltage of a power supply device according to an embodiment of the invention.

FIG. 5 is a diagram of a waveform of an output voltage VOUT of the power supply device 200 according to an embodiment of the invention. According to the measurement of FIG. 5, in the burst mode MD2, the compensation circuit 270 of the invention can substitute for the second output stage circuit 260 to provide the output supply, and its corresponding second voltage V2 can cancel the non-ideal ripples. With the design of the invention, the power supply device 200 can significantly enhance the stability of the output voltage VOUT, regardless of the normal mode MD1 or the burst mode MD2.

The invention proposes a novel power supply device, which automatically adjusts the supply of an output voltage according to different operational modes. According to practical measurements, the power supply device using the aforementioned design can effectively improve the whole output stability, and therefore it is suitable for application in a variety of devices.

Note that the above voltages, currents, resistances, inductances, capacitances and other element parameters are not limitations of the invention. A designer can adjust these parameters according to different requirements. The power supply device of the invention is not limited to the configurations of FIGS. 1-5. The invention may merely include any one or more features of any one or more embodiments of FIGS. 1-5. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device with high output stability, comprising:
a bridge rectifier, generating a rectified voltage according to a first input voltage and a second input voltage;
a first inductor, receiving the rectified voltage;
a first power switch element, selectively coupling the first inductor to a ground voltage according to a clock voltage;
a first output stage circuit, coupled to the first inductor;
a transformer, comprising a main coil and a secondary coil, wherein the main coil is coupled to the first output stage circuit;
a second power switch element, selectively coupling the main coil to the ground voltage according to the clock voltage;
a second output stage circuit, coupled to the secondary coil;
a compensation circuit, receiving the rectified voltage;
an MCU (Microcontroller Unit), generating the clock voltage; and
a PD (Power Delivery) IC (Integrated Circuit), generating a state voltage according to a communication voltage;
wherein the MCU operates in a normal mode or a burst mode according to the state voltage;
wherein in the normal mode, the MCU controls the second output stage circuit to provide an output voltage;
wherein in the burst mode, the MCU controls the compensation circuit to provide the output voltage;
wherein the bridge rectifier comprises:
a first diode, wherein the first diode has an anode coupled to a first input node for receiving the first input voltage, and a cathode coupled to a first node for outputting the rectified voltage;
a second diode, wherein the second diode has an anode coupled to a second input node for receiving the second input voltage, and a cathode coupled to the first node;
a third diode, wherein the third diode has an anode coupled to the ground voltage, and a cathode coupled to the first input node; and
a fourth diode, wherein the fourth diode has an anode coupled to the ground voltage, and a cathode coupled to the second input node;
wherein the first inductor has a first terminal coupled to the first node for receiving the rectified voltage, and a second terminal coupled to a second node;
wherein the first output stage circuit comprises:
a fifth diode, wherein the fifth diode has an anode coupled to the second node, and a cathode coupled to a third node; and
a first capacitor, wherein the first capacitor has a first terminal coupled to the third node, and a second terminal coupled to the ground voltage;
wherein a leakage inductor and a magnetizing inductor are further built in the transformer;
wherein the leakage inductor has a first terminal coupled to the third node, and a second terminal coupled to a fourth node, wherein the main coil has a first terminal coupled to the fourth node, and a second terminal coupled to a fifth node, wherein the magnetizing inductor has a first terminal coupled to the fourth node, and a second terminal coupled to the fifth node, and wherein the secondary coil has a first terminal coupled to a sixth node, and a second terminal coupled to a common node;
wherein the second output stage circuit comprises:
a sixth diode, wherein the sixth diode has an anode coupled to the sixth node, and a cathode coupled to a seventh node for outputting a first voltage;
a second capacitor, wherein the second capacitor has a first terminal coupled to the seventh node, and a second terminal coupled to the common node;
a third transistor, wherein the third transistor has a control terminal for receiving a first control voltage, a first terminal coupled to an output node, and a second terminal coupled to the seventh node for receiving the first voltage; and
a third capacitor, wherein the third capacitor has a first terminal coupled to the output node, and a second terminal coupled to the common node;
wherein the compensation circuit comprises:
an inverter, wherein the inverter has an input terminal for receiving the clock voltage, and an output terminal for outputting an inverted voltage;
a fourth transistor, wherein the fourth transistor has a control terminal for receiving the inverted voltage, a first terminal coupled to an eighth node, and a second terminal coupled to the first node for receiving the rectified voltage;
a second inductor, wherein the second inductor has a first terminal coupled to the eighth node, and a second terminal coupled to a ninth node for outputting a second voltage; and
a resistor, wherein the resistor has a first terminal coupled to the ninth node, and a second terminal coupled to the ground voltage.

2. The power supply device as claimed in claim 1, wherein the power supply device supports a standard of USB (Universal Serial Bus) Type-C, and the PD IC receives the communication voltage through a CC (Configuration Channel) pin.

3. The power supply device as claimed in claim 1, wherein the first power switch element comprises:
a first transistor, wherein the first transistor has a control terminal for receiving the clock voltage, a first terminal coupled to the ground voltage, and a second terminal coupled to the second node.

4. The power supply device as claimed in claim 1, wherein the second power switch element comprises:
a second transistor, wherein the second transistor has a control terminal for receiving the clock voltage, a first terminal coupled to the ground voltage, and a second terminal coupled to the fifth node.

5. The power supply device as claimed in claim 1, wherein the compensation circuit further comprises:
an adder, adding up the first voltage and the second voltage, so as to generate a third voltage; and
a fifth transistor, wherein the fifth transistor has a control terminal for receiving a second control voltage, a first terminal coupled to the output node, and a second terminal for receiving the third voltage.

6. The power supply device as claimed in claim 5, wherein the MCU further generates the first control voltage and the second control voltage according to the state voltage, and wherein the first control voltage and the second control voltage have complementary logic levels.

\* \* \* \* \*